Jan. 25, 1966  G. J. FILIA  3,230,757
FORMING TOOL AND STRIP-FEEDING MECHANISM THEREFOR
Filed July 10, 1963  2 Sheets-Sheet 1
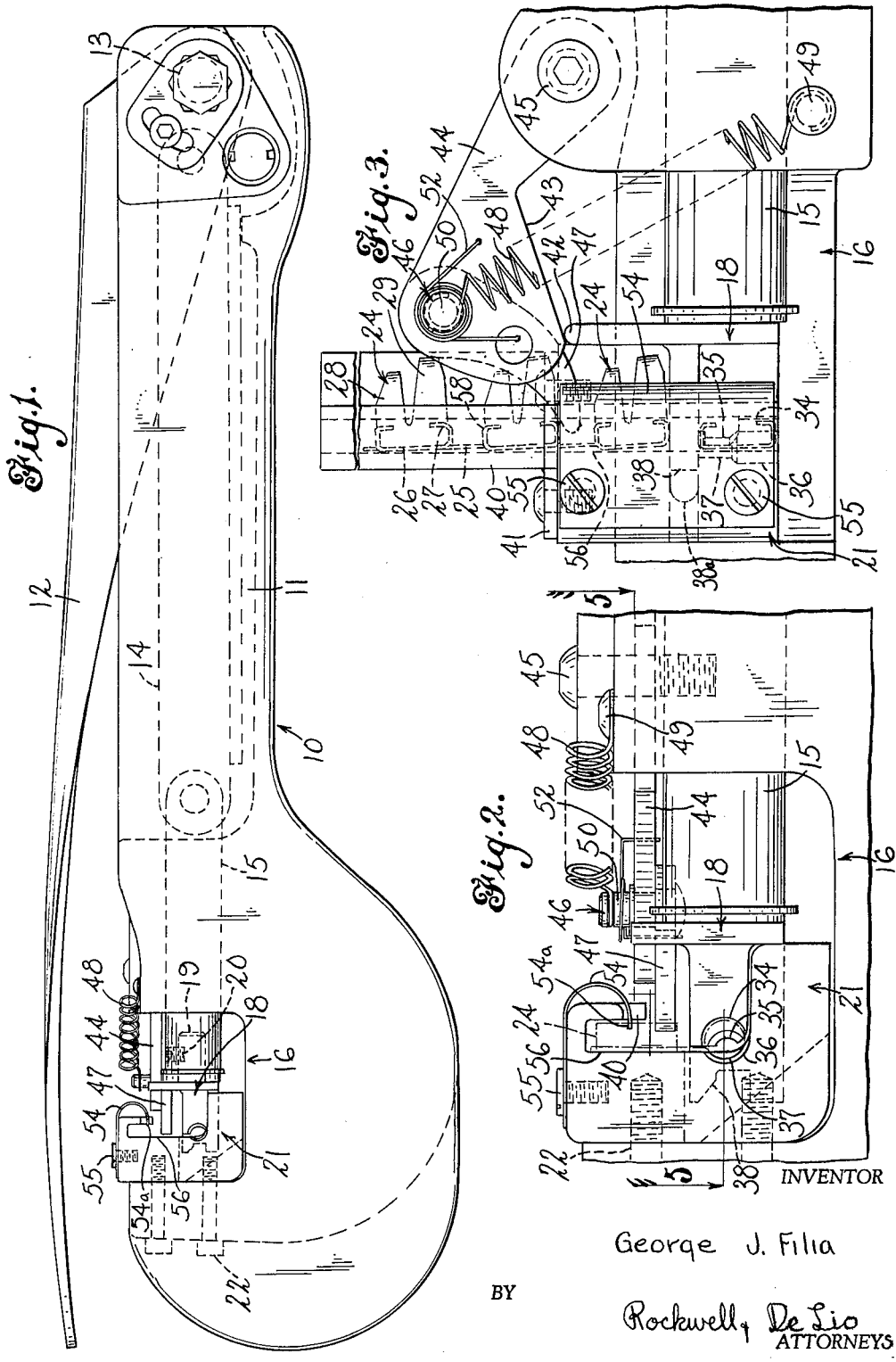
INVENTOR
George J. Filia
BY
Rockwell, DeLio
ATTORNEYS Jan. 25, 1966   G. J. FILIA   3,230,757
FORMING TOOL AND STRIP-FEEDING MECHANISM THEREFOR
Filed July 10, 1963   2 Sheets-Sheet 2
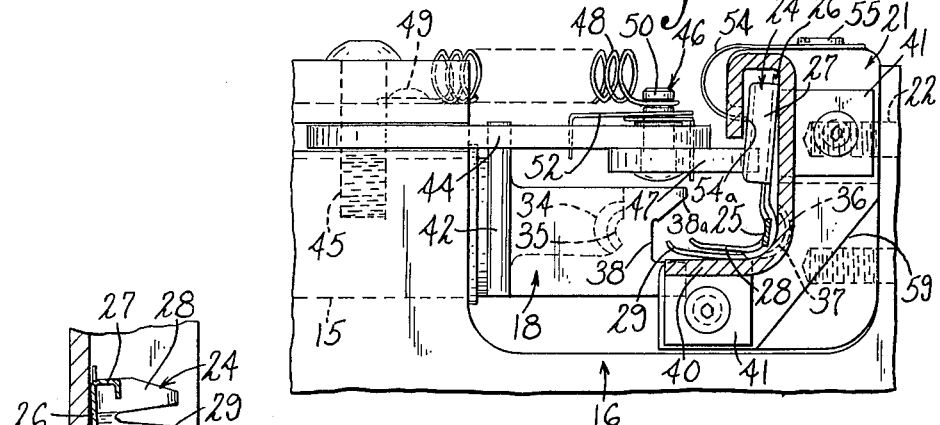
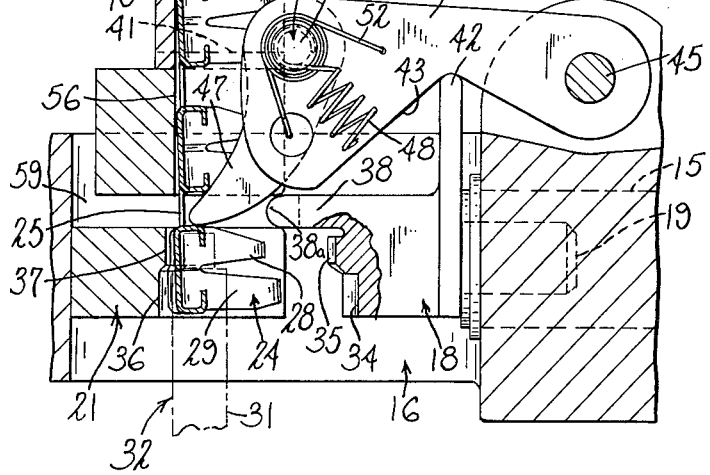
INVENTOR
George J. Filia
BY Rockwell & De Lio
ATTORNEYS United States Patent Office 3,230,757
Patented Jan. 25, 1966

3,230,757
FORMING TOOL AND STRIP-FEEDING
MECHANISM THEREFOR
George J. Filia, Shelton, Conn., assignor to
Sargent & Company, New Haven, Conn.
Filed July 10, 1963, Ser. No. 293,947
3 Claims. (Cl. 72—410)

This invention relates to strip-feeding mechanisms and more particularly relates to a strip-feeding mechanism used in conjunction with forming apparatus.

It is common practice in industrial applications to perform a forming operation on work pieces which are joined in a continuous strip. In such applications the work pieces in strip or belt form are successively fed to a forming tool such as a reciprocating die which simultaneously forms the work piece into a desired shape and cuts the work piece from the continuous strip, the work pieces being held in strip form by a joining tab which is removed by the forming tool. In forming operations as discussed above it is quite important that the work piece to be acted upon is positively positioned and also positively held for operation thereon by the forming tool. Preferably the work piece to be formed should be positively held during the forming stroke of the forming tool to insure proper registry and therefore proper forming of the work piece by the forming tool.

Accordingly, an object of this invention is to provide a forming tool having new and improved means for feeding work pieces in strip form to a forming position and positively holding the work pieces in a predetermined position during the forming stroke of the tool.

Another object of this invention is to provide a new and improved strip-feeding mechanism for a forming tool having positive means for holding a work piece in a position to be formed throughout a forming operation of the forming tool.

A further object of this invention is to provide a strip-feeding mechanism for a forming tool wherein a work piece of a strip of work pieces is always properly positioned and positively held in such position prior to and during a forming operation thereon.

A still further object of this invention is to provide a mechanism of the type described wherein the work piece to be formed is positively held at a portion thereof remote from the part to be formed.

The features of the invention which are believed to be novel are pointed out with particularity and distinctly claimed in the concluding portion of this specification. However, the invention both as to its organization and operation, together with further objects and advantages thereof, may best be appreciated by reference to the following description taken in conjunction with the drawings wherein:

FIG. 1 is a side elevation of a forming tool incorporating a strip-feeding mechanism embodying the inventions;

FIG. 2 is an enlarged, fragmentary view of the forming mechanism of FIG. 1 incorporated in the tool of FIG. 1;

FIG. 3 is a top plan view of the mechanism illustrated in FIG. 2, and illustrates a strip-feeding mechanism associated therewith;

FIG. 4 is a view similar to FIG. 2, but showing the forming mechanism and strip-feeding mechanism from the opposite side of the tool with respect to the side shown in FIG. 2;

FIG. 5 is a sectional view seen along line 5—5 of FIG. 2; and

FIG. 6 is a perspective view of work pieces in strip form to be acted upon by the apparatus embodying the invention, and shows a formed work piece together with an object upon which it is formed.

The invention is illustrated as incorporated in a set of crimping dies operated by a hand tool 10 comprising handle portions 11 and 12. Handle portions 11 and 12 are relatively pivotal through a connection at 13. Pivotally connected to handle 12 eccentric to pivotal connection 13 is a connecting rod 14 also pivotally connected at the other end thereof to a plunger or ram 15. It may thus be seen that upon relative motion of handle members 11 and 12 reciprocating motion of plunger 15 will be produced in a housing or die mounting portion 16 of tool 10. Housing portion 16 is of generally C shape and provides a recess for mounting forming dies therein as hereinafter explained. It will be understood that the particular hand tool shown is set forth only for purposes of illustration and orientation and a reciprocating member such as plunger 15 may be actuated by any suitable mechanism. The particular hand tool illustrated is disclosed and claimed in co-pending application Serial No. 273,407, filed April 16, 1963, assigned to the same assignee as this application. The hand tool illustrated is of a type in which once a forward or reverse stroke of plunger 15 is commenced, completion of that stroke is compelled before the other stroke is initiated.

Plunger 15 carries thereon a first, movable die member 18 having a portion 19 received in a recess defined in plunger 15 and secured therein by means of a set screw 20. Die member 18 is arranged to cooperate with a second, stationary die member 21 mounted on housing portion 16 in complementary relationship to die member 18 by means such as bolts 22 extending through housing portion 16 into die member 21.

Die members 18 and 21, in the illustrated embodiment of the invention are arranged to crimp a terminal or portions thereof to an electrical conductor. As illustrated in FIG. 6, the work pieces to be formed comprise a plurality of electrical terminals or connectors 24, partially preformed and interconnected in strip fashion by a tab portion 25. Each connector comprises a terminal portion 26 with overlapped ears 27 defining a terminal receptacle, and crimping ears 28 and 29 adapted to be crimped about the bare conductive portion 30 and the insulation 31, respectively, of an electrical conductor 32.

When a connector 24 is positioned between die members 18 and 21, ear 28 thereof is positioned to be crimped to a size which will secure the bare conductor 30 therein, and ear 29 positioned to be crimped to a size which will cause ear 29 to securely engage the conductor 32 about insulating portion 31. The crimped ear 28 provides a good electrical contact between the bare conductor 30 and a connector and both ears 28 and 29 provide a good physical connection of the conductor 32 to the connector.

As most clearly illustrated in FIGS. 2 and 3, movable die member 18 is provided with arcuate die seats 34 and 35 arranged to register with arcuate die seats 36 and 37 defined in stationary die member 21. Die seats 35 and 37 form ear 28 of a terminal 24 about a bare conductor 30 while die seats 34 and 36 form ear 29 of a terminal 24 about the insulated portion 31 of a conductor 32, as illustrated in FIG. 6. Movable die member 18 further includes a shear 38 arranged to shear tab portion 25 from between two terminals 24 as the movable die advances upon a connector to be formed.

In accordance with the invention new and improved means are provided for feeding connectors in strip form between the die members for forming of the connectors. A strip or belt of connectors is carried on a guide member 40 which is of generally C shape in cross section (FIG. 4). Guide member 40 is secured to and aligned with stationary die 21 by means of an attachment thereto comprising a mounting plate 41 on guide 40 secured to the side of stationary die member 21. In this manner a strip or belt of terminals is led to a position between die members 18 and 21.

Means are provided for successively feeding a connector strip, one connector at a time, between the die members for forming thereof. Die member 18 carries a projection or cam finger 42 thereon arranged to cooperate with a camming surface 43 of a feed lever 44 pivotally mounted on housing 16 at 45. Pivotally mounted to lever 44 at 46 is a feed pawl 47. Lever 44 is biased toward die members 18 and 21 by means of a spring 48 having one end secured to housing 16 at 49 and the other end thereof secured to a pin or bolt 50 providing the pivotal connection between lever 44 and feed pawl 47.

Feed pawl 47 is normally held in the positional relationship to lever 44 illustrated, by a spring 52 having one end thereof secured to lever 44 and the other end thereof secured to feed pawl 47. An intermediate portion of spring 52 surrounds bolt 50. Thus, when plunger 15 with die member 18 thereon advances in a forming stroke, cam finger 42 riding along cam surface 43 pivots lever 44 in a clockwise direction, as shown, and lever 44 moves toward the position shown in FIG. 3. As plunger 15 with die member 18 thereon is retracted after a forming stroke, cam finger 42 will ride back along camming surface 43 and spring 48 will pivot lever 44 in a counterclockwise direction, as shown. When plunger 15 retracts, feed pawl 47 will engage the strip between connectors (FIG. 5) and feed the strip a distance sufficient to position a connector between the die members for a forming operation. During a forming stroke, movement of lever 44 between the positions shown in FIG. 5 and FIG. 3 causes feed pawl 47 to move counterclockwise with respect to pivot point 46, against the bias of spring 52, to be in a position to engage a connector next to be placed between the die members.

On the retracting stroke of die 18 pawl 47 feeds the connector strip a predetermined distance such that a terminal will be correctly positioned between the die members. Additionally shear 38 is provided with a rounded leading surface 38a, which will act to accurately position a connector in a forming position, if it is not correctly positioned. Shear 38 is of a thickness only slightly smaller than the dimension between adjacent connectors. If a connector to be formed is inaccurately positioned between the dies, curved surface 38a upon advancing toward the connector will engage either the connector to be formed or the succeeding connector and impart a force thereto to either advance the connector to be formed further between the dies or retract it slightly. In this manner movable die member 18 with shear 38 thereon further assures that the work piece to be formed is accurately positioned prior to forming. The dimensions of lever 44, the shape and dimensions of feed pawl 47 and the stroke of cam finger 42 are selected to feed a connector a predetermined distance to accurately position it between the die members.

The invention further provides means for positively holding a terminal in a forming position during the forming stroke of the movable die member 18. As illustrated, such means comprise a yieldable member, leaf type spring 54, mounted on the stationary die member 21, as by means of bolts 55. Spring 54 is contoured such that it provides a free end 54a having a clearance with wall 56 of die member 21 which is slightly less than the thickness of a connector 24. However, the difference in clearance is insufficient to prevent feed pawl 47 from feeding a connector between wall 56 and the free end 54a of spring 54. When a connector 24 is forced between wall 56 and the free end 54a of spring 54, spring 54 exerts a holding force on the connector so positioned. Spring 54 is sufficiently yieldable to allow feed pawl 47 to force a terminal between the free end thereof and wall 56. The rounded corner 58 (FIG. 5) of a connector aids in initially starting the connector between wall 56 and a free end 54a of spring 54. Additionally, the corner of yieldable spring 54 first engaged by a connector is preferably rounded, not shown, to facilitate entry of a connector between wall 56 and the free end of spring 54.

As most clearly shown in FIG. 5 when movable die member 18 advances on a terminal for forming thereof, camming finger 42 will move feed lever 44 in a clockwise direction, as illustrated, also shear 38 will remove tab portion 25 and force the removed tab portion into a discharge conduit 59 defined in die member 21 from whence it is expelled from the tool.

In operation, when handle 12 is opened plunger 15 is retracted, causing feed pawl 47 to position a connector between the die members. At this time an electrical conductor having insulation 31 removed from the conductors thereof is positioned on a connector between the dies with the bare portion 30 adjacent an ear 28 and the insulated portion 31 against an ear 29. The connector to be formed, at this time, is positively held against die 21 in a forming position by spring 54. When the die member 18 is advanced upon stationary die member 21 the ears 28 and 29 are crimped about portion 30 and 31 of the conductor 32, respectively, in the die seats and the connector is securely connected to the conductor. The formed connector may then be removed from the die by hand. Alternatively it will be ejected by the following connector upon release of handle 12.

It will thus be seen that the invention provides a strip-feeding mechanism which positively advances a strip of work pieces to be formed a positive distance to a forming tool upon each cycle of operation of the forming tool, and further that means are provided which positively position and hold a work piece in a forming position throughout a cycle of operation of the forming tool.

While the invention has been illustrated and described in a preferred embodiment thereof it is to be understood that other embodiments thereof as well as modifications to the disclosed embodiment may occur to those skilled in the art, which do not depart from the spirit and scope of the invention. For example, the strip-feeding mechanism disclosed or an embodiment thereof may be incorporated in types of hand tools other than the one illustrated. Additionally the strip feeding and positioning mechanism may be incorporated in a stationary work station having means for producing reciprocating operation of a die mounting plunger member or ram.

Accordingly, it is intended in the appended claims to cover all embodiments of the invention and modifications thereto which do not depart from the spirit and scope of the invention.

What is claimed is:

1. In a crimper for crimping generally L-shaped electrical connectors supplied in strip form to electrical wires, a support, a first die holder fixed to said support, a second die holder mounted for movement toward and away from the first die holder, the die holders carrying cooperating crimping dies to sequentially crimp connectors of the strip on wires and the die holders having means associated therewith for shearing each crimped connector from the strip, a guide member of elongated form supported from the first die holder for supporting the strip of connectors, said guide member having a bottom in generally opposing relation to the movable die, having first and second flanges spaced apart and extending longitudinally of said member along marginal portions of the latter and extending toward the movable die, the second flange having a turned distal end portion opposing the first flange, said bottom and said second flange loosely supporting and confining one leg of each L-shaped connector and the first flange supporting the other leg of the connector, means operative on movement in one direction of the movable die holder to feed and locate one at a time and sequentially all connectors of the strip to a crimping position intermediate the dies for a crimping operation, means to move the movable die holder for cooperation of the dies to crimp a connector, and yieldable connector-retaining means supported from the first die holder overriding each connector as it is fed on the strip and engageable with the connector in said crimping position to hold it against the bottom of the guide member and prevent dislocation of the connector as the dies close upon it, the last-named means extending between said flanges of the guide member and comprising a leaf spring having a portion overlying said second flange and being turned inwardly toward said bottom of the guide member, said leaf spring being dimensioned to support in said guide member in addition to the last-mentioned connector the next preceding connector on the strip.

2. In a plierlike tool for crimping generally L-shaped connectors supplied in strip form to electrical wires, a pair of handle elements pivotally interconnected, a first die holder supported from one of said handles, a second die holder supported from the other handle, the die holders carrying cooperating crimping dies to sequentially crimp connectors of the strip on wires and the die holders having means associated therewith for shearing each crimped connector from the strip, a guide member of elongated form extending transversely of the handles supported from the first die holder for supporting the strip of connectors, said guide member having a bottom in generally opposing relation to the die carried by the second die holder, having first and second flanges spaced apart extending longitudinally of said member along marginal portions of the latter and extending toward the movable die, the second flange having a turned distal end portion opposing the first flange, said bottom and said second flange loosely supporting and confining one leg of each L-shaped connector and the first flange supporting the other leg of the connector, means operative on relative movement of the handles in one direction to feed and locate one at a time and sequentially all connectors of the strip to a crimping position intermediate the dies for a crimping operation, and yieldable connector-retaining means supported from the first die holder overriding each connector as it is fed on the strip and engageable with the connector in said crimping position to hold it against the bottom of said guide member and prevent dislocation of the connector as the dies close upon it, the last-named means extending between said flanges of the guide member and comprising a leaf spring having a portion overlying said second flange and being turned inwardly toward said bottom of the guide member, said leaf spring being dimensioned to support in said guide member in addition to the last-mentioned connector the preceding connector on the strip.

3. In a plierlike tool for crimping generally L-shaped connectors supplied in strip form to electrical wires, a frame having a handle portion, a handle element pivotally interconnected to said frame, a first die holder having a fixed support from said frame, a second die holder, means supported on the frame and slidable therein carrying the second die holder and comprising a ram carrying the last-mentioned holder, means pivotally interconnecting the ram and said handle element for reciprocating movement of the ram on relative movements of the handle element and said handle portion, the die holders carrying cooperating crimping dies to sequentially crimp connectors of the strip on wires and the die holders having means associated therewith for shearing each crimped connector from the strip, a guide member of elongated form extending transversely of said handle portion and said handle element supported from the first die holder for supporting the strip of connectors, said guide member having a bottom in generally opposing relation to the die carried by the second die holder, having first and second flanges spaced apart extending longitudinally of said member along marginal portions of the latter and extending toward the movable die, the second flange having a turned distal end portion opposing the first flange, said bottom and said second flange loosely supporting and confining one leg of each L-shaped connector and the first flange supporting the other leg of the connector, means operative on relative movement of said handle element and said handle portion in one direction to feed and locate one at a time and sequentially all connectors of the strip to a crimping position intermediate the dies for a crimping operation, said handle element and said handle portion being relatively movable in the opposite direction to effect cooperation of the dies to crimp a connector, and yieldable connector-retaining means supported from the first die holder overriding each connector as it is fed on the strip and engageable with the connector in said crimping position to hold it against the bottom of said guide member and prevent dislocation of the connector as the dies close upon it, the last-named means extending between said flanges of the guide member.

References Cited by the Examiner
UNITED STATES PATENTS

| | | | |
|---|---|---|---|
| 2,024,416 | 12/1935 | Allison | 1—399 |
| 2,727,236 | 12/1955 | Klumpp | 1—399 |
| 2,812,676 | 11/1957 | Brown | 1—399 |
| 2,858,537 | 11/1958 | Cootes | 1—399 |
| 2,876,452 | 3/1959 | Herman et al. | 1—398 |

GRANVILLE Y. CUSTER, JR., *Primary Examiner.*